United States Patent [19]

Yoshizawa et al.

[11] Patent Number: 5,149,352
[45] Date of Patent: Sep. 22, 1992

[54] METHOD OF AND SYSTEM FOR BENDING SHEET GLASS

[75] Inventors: Hideo Yoshizawa; Yasuhiko Saikawa; Noriaki Kanda; Norihiko Higashide, all of Osaka, Japan

[73] Assignee: Nippon Sheet Glass Co., Ltd., Osaka, Japan

[21] Appl. No.: 614,832

[22] Filed: Nov. 16, 1990

[30] Foreign Application Priority Data

Nov. 17, 1989 [JP] Japan .................. 1-299388

[51] Int. Cl.$^5$ ........................................ C03B 23/023
[52] U.S. Cl. ........................................ 65/106; 65/162; 65/273
[58] Field of Search ................ 65/103, 106, 273, 104, 65/162

[56] References Cited

U.S. PATENT DOCUMENTS

| | | | |
|---|---|---|---|
| 2,144,320 | 1/1939 | Bailey | 65/349 |
| 3,249,415 | 5/1966 | McMaster et al. | 65/160 |
| 3,293,021 | 12/1966 | Stilley et al. | 65/111 |
| 3,672,861 | 6/1972 | Ritter et al. | 65/350 |
| 3,676,098 | 7/1972 | Hall | 65/106 |
| 3,744,985 | 7/1973 | Peternel . | |
| 3,955,955 | 5/1976 | Melling | 65/104 |
| 4,043,782 | 8/1977 | Bamford et al. . | |
| 4,071,344 | 1/1978 | Blausey, Jr. . | |
| 4,767,439 | 8/1988 | Reunamaki . | |
| 4,826,522 | 5/1989 | d'Iribarne . | |

FOREIGN PATENT DOCUMENTS

| | | |
|---|---|---|
| 799907 | 11/1968 | Canada . |
| 0277074A1 | 8/1988 | European Pat. Off. . |
| 2164455 | 12/1971 | France . |
| 63-260833 | 10/1988 | Japan . |
| WO89/07581 | 8/1989 | PCT Int'l Appl. . |
| 782502 | 9/1957 | United Kingdom . |
| 2011377 | 7/1979 | United Kingdom . |

Primary Examiner—Joye L. Woodard
Attorney, Agent, or Firm—Merchant, Gould, Smith, Edell, Welter & Schmidt

[57] ABSTRACT

A sheet of glass is bent with a system including a feed mechanism for feeding the sheet of glass along a predetermined path, a heating furnace disposed along the path, for heating the sheet of glass, and a shaping device disposed along the path for bending the sheet of glass heated by the heating furnace. Before the sheet of glass is bent by the shaping device, the sheet of glass is thermally processed to different degrees at leading and trailing end portions thereof along the path, thereby uniformizing temperatures of the sheet of glass from the leading end portion to the trailing end portion thereof.

10 Claims, 4 Drawing Sheets

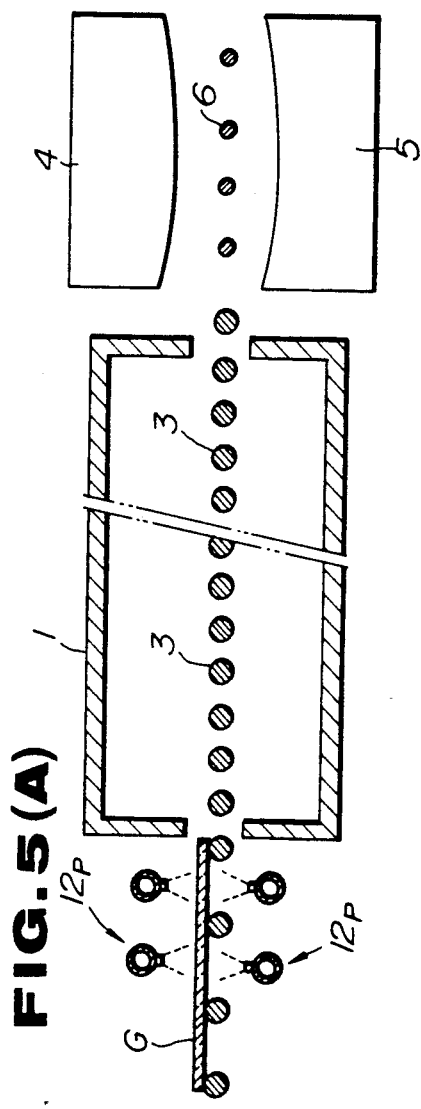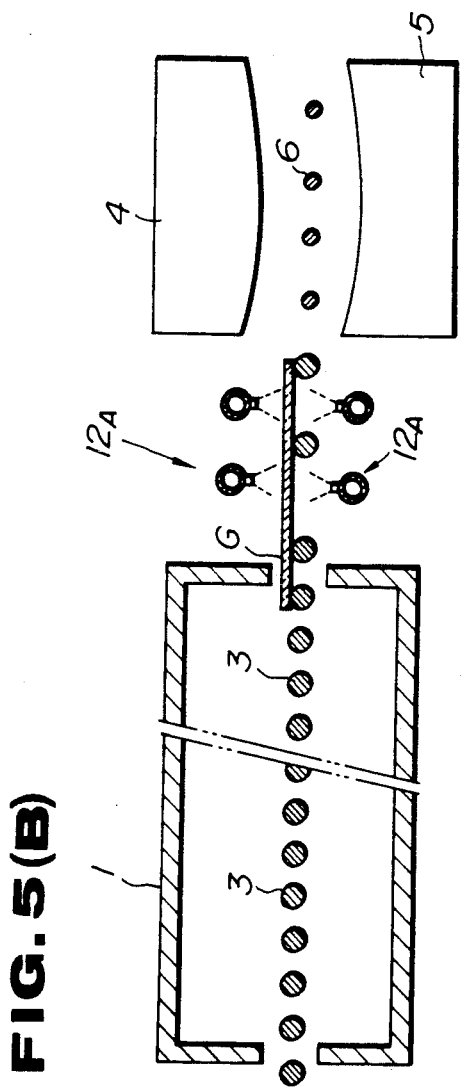

METHOD OF AND SYSTEM FOR BENDING SHEET GLASS

BACKGROUND OF THE INVENTION

1. Field of the Invention

The present invention relates to a method of and a system for bending a sheet of glass after the sheet of glass is heated in a heating furnace and delivered out of the heating surface, and more particularly to a method of and a system for bending a sheet of glass whose heating temperatures have been uniformized over its entire surface area before the step of bending the sheet of glass.

2 Description of the Relevant Art

Heretofore, there were basically two methods of bending sheet glass. According to one method, a sheet of glass is bent within a heating furnace. The other method is directed to the bending of a sheet of glass outside of a heating furnace. According to the latter method, a bending device is disposed adjacent to the outlet of a tunnel-shaped heating furnace. The sheet of glass is fed into the heating furnace and then heated while being conveyed through the heating furnace. The heated glass sheet is delivered horizontally out of the heating furnace, and positioned between upper and lower mold members of the bending device. Thereafter, the glass sheet is pressed to shape by the upper and lower mold members.

The method of bending sheet glass outside of the heating furnace suffers the following problem: Even if the glass sheet is evenly heated within the heating furnace, when the glass sheet is delivered out of the heating furnace, the leading and trailing ends of the glass sheet are cooled for different periods of times before the glass sheet reaches the pressing position in the bending device. For example, when the glass sheet is heated to 650° C. in the heating furnace, it is cooled at a rate of 6.2 degrees/second if its thickness is 3.5 mm, and at a rate of 6.6 degrees/second if its thickness is 3.1 mm. At the time the glass sheet is bent to shape, the leading and trailing ends thereof have different temperatures which may depend on surrounding conditions. The different temperatures then lead to different viscosities of the leading and trailing ends, resulting in possible cracks in the glass sheet when it is pressed or cooled, or inaccurate bent configurations.

SUMMARY OF THE INVENTION

In view of the aforesaid problem of the conventional sheet glass bending method, it is an object of the present invention to provide a method of and a system for bending a sheet of glass, with heating temperatures being uniformized from leading and trailing ends of the sheet of glass in the direction in which it is fed before the step of bending the sheet of glass.

According to the present invention, there is provided a method of bending a sheet of glass with a system including a feed mechanism for feeding the sheet of glass along a predetermined path, a heating furnace disposed along the path, for heating the sheet of glass, and a shaping device disposed along the path for bending the sheet of glass heated by the heating furnace, the method comprising the steps of bending the sheet of glass with the shaping device, and before the sheet of glass is bent with the shaping device, thermally processing the sheet of glass to different degrees at leading and trailing end portions thereof along the path, thereby uniformizing temperatures of the sheet of glass from the leading end portion to the trailing end portion thereof.

According to the present invention, there is also provided a system for heating and bending a sheet of glass, comprising a heating furnace for heating the sheet of glass, a shaping device for bending the sheet of glass which has been heated by and delivered out of the heating furnace, a feed mechanism for feeding the sheet of glass to the shaping device along a predetermined path extending through at least the heating furnace, and thermally processing means, disposed along the path, for thermally processing the sheet of glass to different degrees at leading and trailing end portions thereof along the path, thereby uniformizing temperatures of the sheet of glass from the leading end portion to the trailing end portion thereof before the sheet of glass is bent with the shaping device.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 5(A) is a schematic side elevational view, partly in cross section, of a sheet glass bending system according to a third embodiment of the present invention; and FIG. 5(B) is a schematic side elevational view, partly in cross section, of a sheet glass bending system according to a modification of the sheet glass bending system shown in FIG. 5(A).

DETAILED DESCRIPTION OF THE PREFERRED EMBODIMENTS

Figure 1:
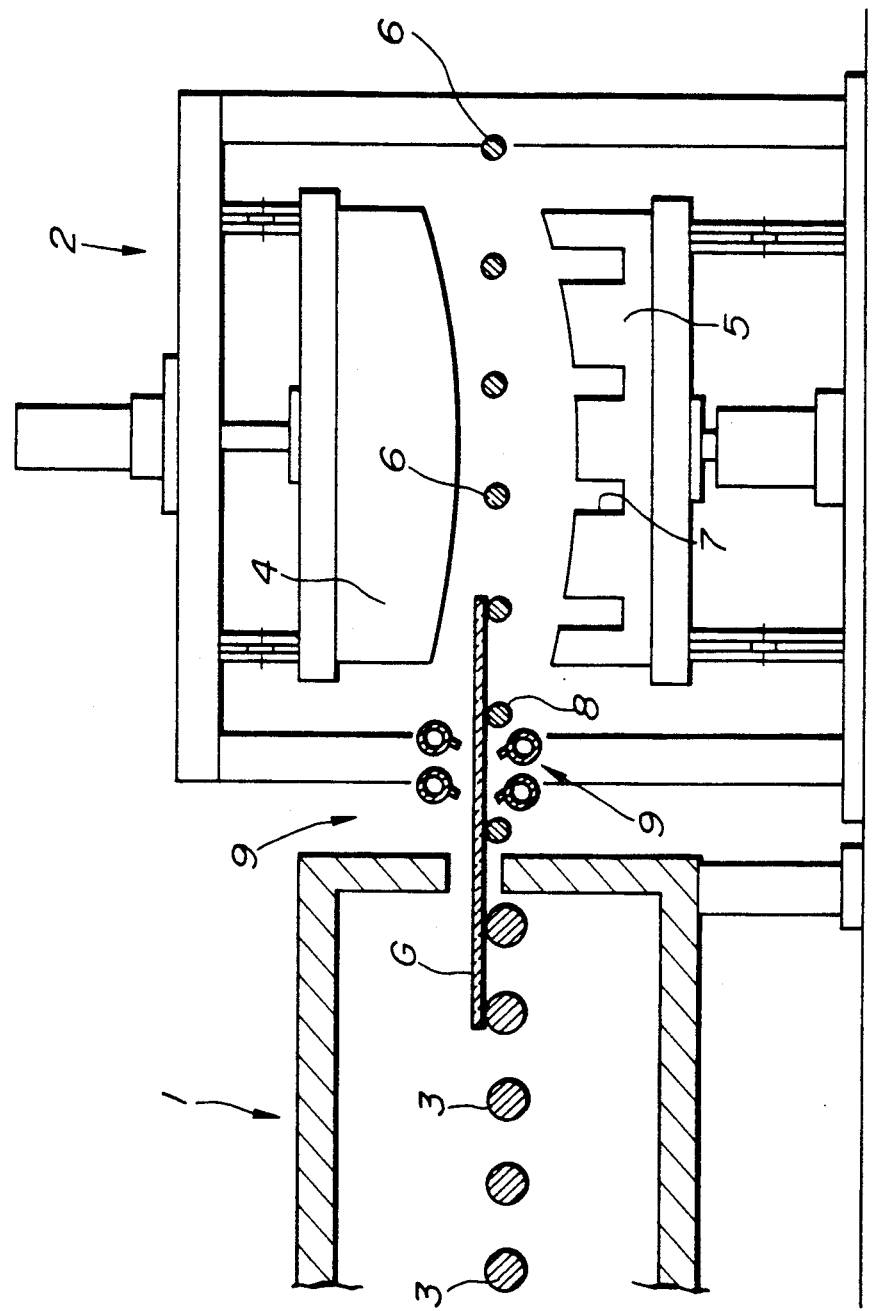
FIG. 1 is a schematic side elevational view, partly in cross section, of a sheet glass bending system according to a first embodiment of the present invention.

FIG. 1 schematically shows a sheet glass bending system for heating and bending a sheet of glass G. The sheet glass bending system has a heating furnace 1 and shaping device 2 which are arranged along the path of the glass sheet G. The heating furnace 1 houses a plurality of feed rolls 3 for conveying the glass sheet G in a horizontal condition. The shaping device 2 has upper and lower mold members 4, 5 which are vertically movable toward and away from each other, and a plurality of vertically movable press rolls 6 disposed between the upper and lower mold members 4, 5. The lower mold member 5 has upwardly opening recesses 7 for receiving some of the press rolls 6 when the press rolls 6 are lowered or the lower mold member 5 is elevated.

Figure 2:
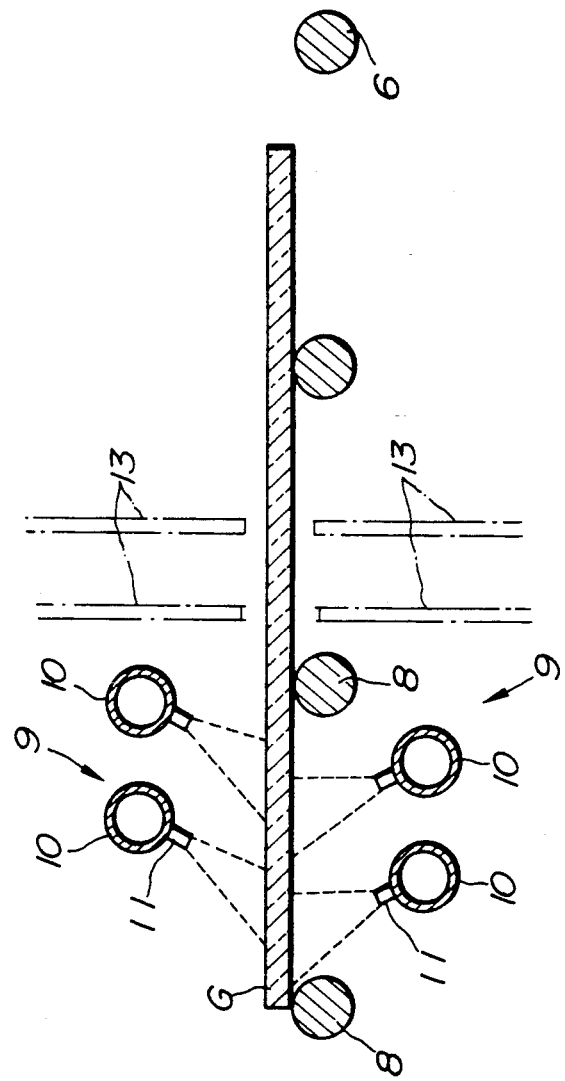
FIG. 2 is an enlarged sectional side elevational view of cooling devices in the sheet glass bending system shown in FIG. 1.
Figure 3:
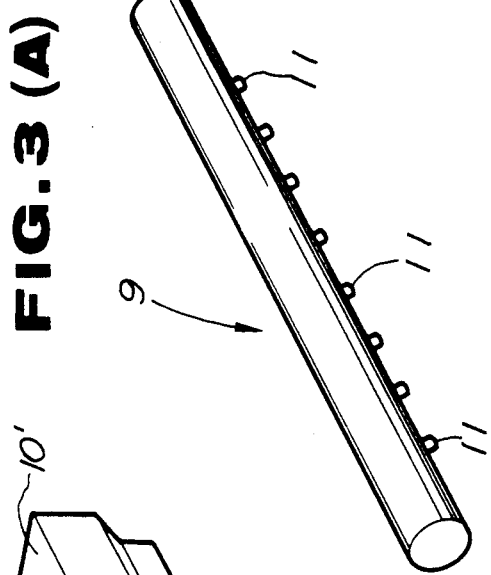
FIG. 3(A) is a perspective view of one of the cooling devices shown in FIG. 2.
FIG. 3(B) is a perspective view of a modified cooling device.
Figure 3:
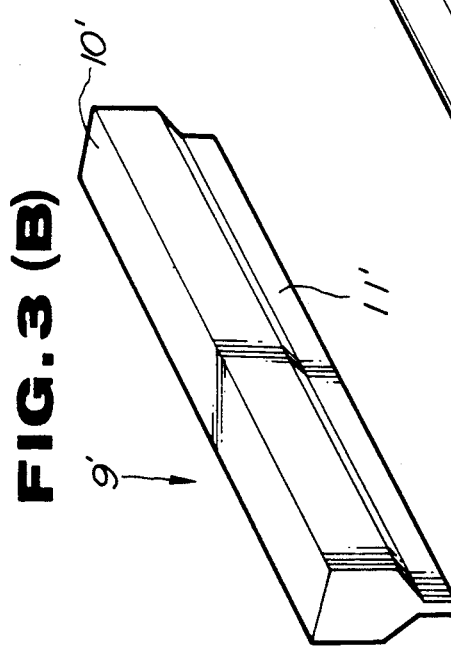

In the vicinity of the outlet of the heating furnace 1, there are disposed transfer rolls 8 for receiving the glass sheet G delivered out of the heating furnace 1 by the feed rolls 3 and for transferring the received glass sheet G onto the press rolls 6 in the shaping device 2. Cooling devices 9 are disposed above and below the transfer rolls 8. As shown in FIG. 3(A), each of the cooling devices 9 is in the form of an air blower which comprises a hollow pipe 10 connected to a source of air and an array of nozzles 11 mounted on the hollow pipe 10 and communicating with the interior space of the hollow pipe 10. As shown in FIG. 2, the nozzles 11 are generally directed toward the glass sheet G as it is fed by the transfer rolls 8, and oriented obliquely upstream with respect to the direction in which the glass sheet G is fed from the heating furnace 1 to the shaping device 2. The nozzles 11 thus obliquely oriented upstream eject air upstream toward the glass sheet G, rather than downstream toward the glass sheet G, so that the portion of the glass sheet G which has moved past the cooling device 9 will not be cooled by the air ejected from the nozzles 11. Alternatively, as shown in FIG. 2, baffle plates 13 may be disposed downstream of the nozzles 11.

FIG. 3(B) show a modified cooling device 9'. The cooling device 9' comprises a duct 10' having an elongate slit- or slot-like nozzle 11' extending along the duct 10'.

The cooling devices 9 or 9' may be disposed either above or below the glass sheet G carried by the transfer rolls 8. The nozzles 11 or 11' of each cooling device may be disposed in a single row or a plurality of rows. However, a plurality of rows of nozzles 11 or 11' are more effective to cool the glass sheet G. If the transfer rolls 8 are preliminary shaping rolls each comprising a curved core, such as an arcuately curved core, and sleeves rotatably fitted over the core, then the pipes 10 or 10' and the baffle plates 13 should preferably be of a shape complementary to the curved preliminary shaping rolls.

The feed rolls 3, the transfer rolls 8, and the press rolls 6 jointly constitute a feed mechanism for feeding the glass sheet G along the feed path into the shaping device 2.

The glass sheet G is bent by the shaping device 2 as follows: The glass sheet G is heated to a temperature close to its softening point within the heating furnace 1. The glass sheet G is then delivered out of the heating furnace 1 and transferred to a position between the upper and lower mold members 4, 5 of the shaping device 2. At this time, the pressure of air ejected from the nozzles 11 of the cooling devices 9 is varied to cool the trailing end portion of the glass sheet G more intensively than the leading end portion thereof, so that the difference between the temperatures of the leading and trailing end portions of the glass sheet G is eliminated, i.e., the temperatures of the leading and trailing end portions of the glass sheet G are uniformized, after the glass sheet G is delivered out of the heating furnace 1. Specifically, the pressure of air ejected from the nozzles 11 is gradually increased as the glass sheet G moves past the cooling devices 9, i.e., is gradually higher from the leading end portion to the trailing end portion of the glass sheet G. The glass sheet G which has thus been uniformly heated substantially over its entire surface is then pressed to shape between the upper and lower mold members 4, 5 of the shaping device 2.

According to the present invention, the glass sheet G is thermally processed to different degrees over its surface from the leading end portion to the trailing end portion while the glass sheet G is being fed from the heating furnace 1 to the shaping device 2, in order to uniformize the temperatures of the glass sheet G from the leading end portion to the trailing end portion before the glass sheet G is bent by the shaping device 2. In the above embodiment, the glass sheet G is thermally processed by the cooling devices 9 which are located near the outlet of the heating furnace 1.

Figure 4:
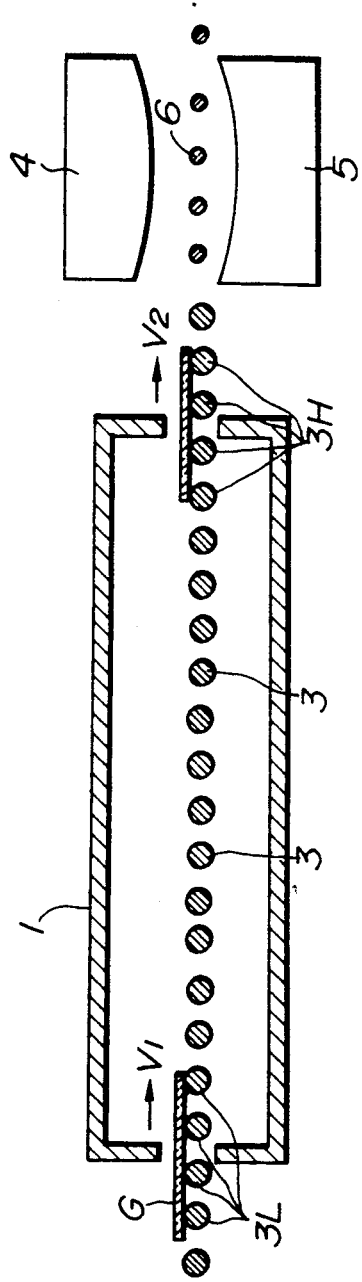
FIG. 4 is a schematic side elevational view, partly in cross section, of a sheet glass bending system according to a second embodiment of the present invention.

FIG. 4 shows in sectional side elevation a sheet glass bending system according to a second embodiment of the present invention. In the second embodiment, the glass sheet G is thermally processed to different degrees at the leading and trailing end portions thereof when the glass sheet G is delivered out of the heating furnace 1 at a speed $V_2$ and into the heating furnace 1 at a speed $V_1$ lower than the speed $V_2$. As a consequence, the leading end portion of the glass sheet G stays in the heating furnace 1 longer than the trailing end portion of the glass sheet G. Therefore, after the glass sheet G is delivered out of the heating furnace 1, even if the leading end portion of the glass sheet G is cooled more intensively, or radiates more heat, than the trailing end portion thereof, the glass sheet G is uniformly heated substantially over its entire surface area when it is pressed to shape.

For example, the speed $V_1$ may be in the range of from 50 mm/s to 120 mm/s, and the speed $V_2$ from 500 mm/s to 1200 mm/s, with the speeds being controlled over a length of about 1000 mm. With the speed $V_2$ being higher than ordinary speeds, since the time in which the high-temperature glass sheet G is held in contact with the feed rolls 3 is relatively short, the glass sheet G will have less elongate defects known as roll wave.

The speed $V_1$ is made lower than the speed $V_2$ as follows: Several feed rolls $3_L$ in the vicinity of the inlet of the heating furnace 1 are independently controlled as a lower-speed feed means to rotate at a speed lower than the speed of the other feed rolls. Several feed rolls $3_H$ in the vicinity of the outlet of the heating furnace 1 are independently controlled as a higher speed feed means to rotate at a speed higher than the speed of the other feed rolls. These lower- and higher-speed feed means serve as a means for carrying out the above thermal processing of the glass sheet G.

FIG. 5(A) shows in sectional side elevation a sheet glass bending system according to a third embodiment of the present invention. In the third embodiment, preheating devices $12_P$ are positioned as a thermal processing means in the vicinity of the inlet of the heating furnace 1. The glass sheet G before it is delivered into the heating furnace 1 is preheated gradually less intensively from its leading end portion to its trailing end portion by the preheating devices $12_p$. Therefore, after the glass sheet G is delivered out of the heating furnace 1, even if the leading end portion of the glass sheet G is cooled more intensively than the trailing end portion thereof, the glass sheet G is uniformly heated substantially over its entire surface area when it is pressed to shape.

The preheating devices $12_P$ may be disposed only above or below the glass sheet G. However, with the preheating devices $12_P$ positioned both above and below the glass sheet G as shown, both upper and lower surfaces of the glass sheet G can be preheated with the same amount of heat energy, so that the glass sheet G is prevented from warping before it is delivered into and after it is delivered out of the heating furnace 1. Preferably, two through five preheating devices $12_P$, for example, are disposed above and below the glass sheet G.

According to a modification shown in FIG. 5(B), postheating devices $12_A$ are disposed adjacent to the outlet of the heating furnace 1. Since the postheating devices 12$_A$ additionally heat the high-temperature glass sheet G as it is delivered out of the heating furnace 1, the glass sheet G is prevented from cracking and warping upon heating. The postheating devices 12$_A$ may be disposed only above or below the glass sheet G.

Each of the preheating devices 12$_P$ and the post-heating devices 12$_A$ may comprise a gas surface heater, an air heater, or nozzles for ejecting hot air.

The sheet glass bending systems according to the first and second embodiments ma be combined with each other.

With the present invention, as described above, in view of the fact that the leading end portion of the glass sheet with respect to the direction in which the glass sheet is delivered out of the heating furnace, is cooled more intensively than the trailing end portion of the glass sheet after the latter is delivered out of the heating furnace, the glass sheet is specially thermally processed in the heating furnace or at the inlet and/or outlet of the heating furnace so that the temperature of the leading end portion of the glass sheet becomes slightly higher than the temperature of the trailing end portion thereof immediately before the glass sheet is introduced into the shaping device. Therefore, when the glass sheet is introduced into the shaping device and is about to be pressed to shape, the entire surface area of the glass sheet is of uniform temperature. The glass sheet is thus free from cracking when it is pressed or cooled, and can be pressed to desired bent shape.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A method of bending a sheet of glass with a system including a feed mechanism for feeding the sheet of glass along a predetermined path, a heating furnace disposed along the path for heating the sheet of glass, and a shaping device disposed along the path for bending the sheet of glass heated by the heating furnace, said method comprising the steps of:

bending the sheet of glass with said shaping device; and before bending the sheet of glass, which is inclined to have an increasing temperature gradient from a leading end portion to a trailing end portion of the sheet of glass by thermal radiation during transfer from said heating furnace to said shaping device, thermally processing the sheet of glass to different degrees from the leading and trailing end portions of the sheet of glass, thereby uniformizing temperatures of the sheet of glass over its entire surface from the leading end portion of the trailing end portion of the sheet of glass, said step of thermally processing the sheet of glass comprises the step of cooling the sheet of glass by cooling means for obliquely ejecting air upstream toward the sheet of glass with respect to the direction in which the sheet of glass is fed from the heating furnace to the shaping device such that the portion of the sheet of glass which has moved past said cooling means is prevented from further cooling by the ejecting air.

2. A method according to claim 1, wherein said cooling step cools the sheet of glass gradually and more intensively from the leading end portion to the trailing end portion thereof with said cooling means, said cooling means being disposed adjacent to an outlet of the heating furnace.

3. A method according to claim 2, wherein said cooling step includes ejecting air from an air blower onto the sheet of glass under a pressure which is gradually higher from the leading end portion to the trailing end portion of the sheet of glass.

4. A method according to claim 3, wherein the step of ejecting air under pressure onto the sheet of glass further includes the step of ejecting air under equal pressure onto the upper and lower surfaces of the sheet of glass.

5. A method according to claim 1, wherein said step of thermally processing the sheet of glass further comprises deflecting air with baffle plates from flowing downstream from the cooling means with respect to the direction in which the sheet of glass is fed from the heating furnace to the shaping device such that the portion of the sheet of glass which has moved past said cooling means is prevented from cooling by the ejecting air.

6. A system for heating and bending a sheet of glass, comprising:

a heating furnace for heating the sheet of glass;

a shaping device for bending the sheet of glass which has been heated by and delivered out of said heating furnace;

a feed mechanism for feeding the sheet of glass to said shaping device along a predetermined path extending through at least said heating furnace; and thermal processing means, disposed along said path, for thermally processing the sheet of glass, which is inclined to have an increasing temperature gradient from a leading end portion to a trailing end portion of the sheet of glass by thermal radiation during transfer from said heating furnace to said shaping device, to different degrees from the leading and trailing end portions of the sheet of glass, thereby uniformizing temperatures of the sheet of glass from the leading end portion to the trailing end portion of the sheet of glass before the sheet of glass is bent with said shaping device, said thermal processing means includes cooling means for obliquely ejecting air upstream toward the sheet of glass with respect to the direction in which the sheet of glass is fed from the heating furnace to the shaping device such that the portion of the sheet of glass which has moved past said cooling means is prevented from further cooling by the ejecting air.

7. A system according to claim 6, wherein said cooling means are disposed adjacent to an outlet of said heating furnace for cooling the sheet of glass gradually and more intensively from the leading end portion of the trailing end portion of the sheet of glass.

8. A system according to claim 7, wherein said cooling means comprises an air blower for ejecting air onto the sheet of glass under a pressure which is gradually higher from the leading end portion to the trailing end portion of the sheet of glass.

9. A system according to claim 8, wherein said air blower includes means for ejecting air under equal pressure onto the upper and lower surfaces of the sheet of glass.

10. A system according to claim 6, wherein said cooling means includes baffle plates disposed downstream from the cooling means with respect to the direction in which the sheet of glass is fed from the heating furnace to the shaping device such that the portion of the sheet of glass which has moved past said cooling means is prevented from cooling by the ejecting air.

* * * * *

UNITED STATES PATENT AND TRADEMARK OFFICE
CERTIFICATE OF CORRECTION

PATENT NO. : 5,149,352
DATED : September 22, 1992
INVENTOR(S) : Yoshizawa, Saikawa, Kanda, Higashide It is certified that error appears in the above-identified patent and that said Letters Patent is hereby corrected as shown below:

Column 5, line 10; "ma be" should read --may be--.

Column 6, line 51, claim 7; "of" should read --to--.

Signed and Sealed this

Thirtieth Day of November, 1993

*Attest:*

BRUCE LEHMAN

*Attesting Officer*     *Commissioner of Patents and Trademarks*